(12) United States Patent
Kim et al.

(10) Patent No.: US 12,342,108 B2
(45) Date of Patent: Jun. 24, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Jiman Kim, Suwon-si (KR); Jaesung Park, Suwon-si (KR); Seongwoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 17/704,459

(22) Filed: Mar. 25, 2022

(65) Prior Publication Data
US 2022/0385867 A1 Dec. 1, 2022

Related U.S. Application Data

(63) Continuation of application No. PCT/KR2022/002569, filed on Feb. 22, 2022.

(30) Foreign Application Priority Data

Jun. 1, 2021 (KR) .................. 10-2021-0070793
Oct. 13, 2021 (KR) .................. 10-2021-0136104

(51) Int. Cl.
H04N 9/31 (2006.01)

(52) U.S. Cl.
CPC ......... *H04N 9/3185* (2013.01); *H04N 9/3194* (2013.01)

(58) Field of Classification Search
CPC ...... H04N 9/3185; H04N 9/3194; H04N 9/31; G06K 7/14; G03B 21/147
(Continued)

(56) References Cited

U.S. PATENT DOCUMENTS 6,520,647 B2    2/2003  Raskar
6,963,348 B2   11/2005  Diamond et al.
(Continued)

FOREIGN PATENT DOCUMENTS

CN    110913191      3/2020
JP    2005-136699    5/2005
(Continued)

OTHER PUBLICATIONS

Li et al., "Automatic keystone correction for smart projectors with embedded camera", 2004 International Conference on Image Processing (ICIP), 2004, downloaded May 28, 2021, 4 pages.
(Continued)

*Primary Examiner* — Magda Cruz
(74) *Attorney, Agent, or Firm* — Nixon & Vanderhye, P.C.

(57) ABSTRACT

An electronic apparatus is disclosed. The electronic apparatus includes: an image projector, and a processor configured to: control the image projector to project a test image including a plurality of markers onto a projection plane, based on first information indicating a location of the plurality of markers in the test image and second information indicating a location of the plurality of markers in an image of the projection plane photographed by an external device, acquire third information indicating a location of a vertex of the test image in the photographed image, correct the third information based on posture information of the external device, and perform keystone correction based on the corrected third information.

20 Claims, 21 Drawing Sheets

(58) Field of Classification Search
USPC .......................................................... 353/69
See application file for complete search history.

(56) References Cited

U.S. PATENT DOCUMENTS

| | | | |
|---|---|---|---|
| 7,036,940 | B2 | 5/2006 | Matsuda et al. |
| 7,175,285 | B2 | 2/2007 | Li et al. |
| 7,909,470 | B2 * | 3/2011 | Yonezawa ............ H04N 5/7416 |
| | | | 353/69 |
| 8,870,386 | B2 | 10/2014 | Kasuya et al. |
| 9,039,195 | B2 | 5/2015 | Tanaka |
| 9,128,366 | B2 | 9/2015 | Oda |
| 9,589,333 | B2 | 3/2017 | Maeno |
| 9,762,871 | B2 | 9/2017 | De La Cruz et al. |
| 11,076,138 | B2 | 7/2021 | Cheng et al. |
| 2012/0127323 | A1 | 5/2012 | Kasuya et al. |
| 2013/0314388 | A1 | 11/2013 | Oda |
| 2014/0204204 | A1 | 7/2014 | Sumiyoshi et al. |
| 2015/0062542 | A1 | 3/2015 | Appia |
| 2015/0178903 | A1 | 6/2015 | Maeno |
| 2019/0087946 | A1 | 3/2019 | Chiba |
| 2019/0191134 | A1 * | 6/2019 | Urano .................. H04N 9/3147 |
| 2019/0281266 | A1 * | 9/2019 | Urano .................. H04N 9/3194 |
| 2019/0327457 | A1 * | 10/2019 | Urano et al. ......... H04N 9/3194 |
| 2020/0366877 | A1 | 11/2020 | Cheng et al. |

FOREIGN PATENT DOCUMENTS

| | | | |
|---|---|---|---|
| JP | 2008-287426 | 11/2008 | |
| JP | 2014-003586 | 1/2014 | |
| JP | 2015-122614 | 7/2015 | |
| JP | 2020-187358 | 11/2020 | |
| KR | 10-0710946 | 4/2007 | |
| KR | 10-2009-0090682 | 8/2009 | |
| KR | 10-2010-0076854 | 7/2010 | |
| KR | 10-2012-0043013 | 5/2012 | |
| KR | 10-1428064 | 8/2014 | |
| KR | 10-2015-0000911 | 1/2015 | |
| WO | WO-2006077665 A1 * | 7/2006 | ........... G03B 21/145 |

OTHER PUBLICATIONS

Search Report and Written Opinion issued May 30, 2022 in counterpart International Patent Application No. PCT/KR2022/002569.
Extended Search Report dated Jul. 5, 2024 in European Patent Application No. 22816258.2.

* cited by examiner

RELATIONSHIP BETWEEN FOCAL DISTANCE AND ANGLE OF VIEW

SHORT FOCAL DISTANCE AND
WIDE ANGLE OF VIEW

LONG FOCAL DISTANCE AND
NARROW ANGLE OF VIEW

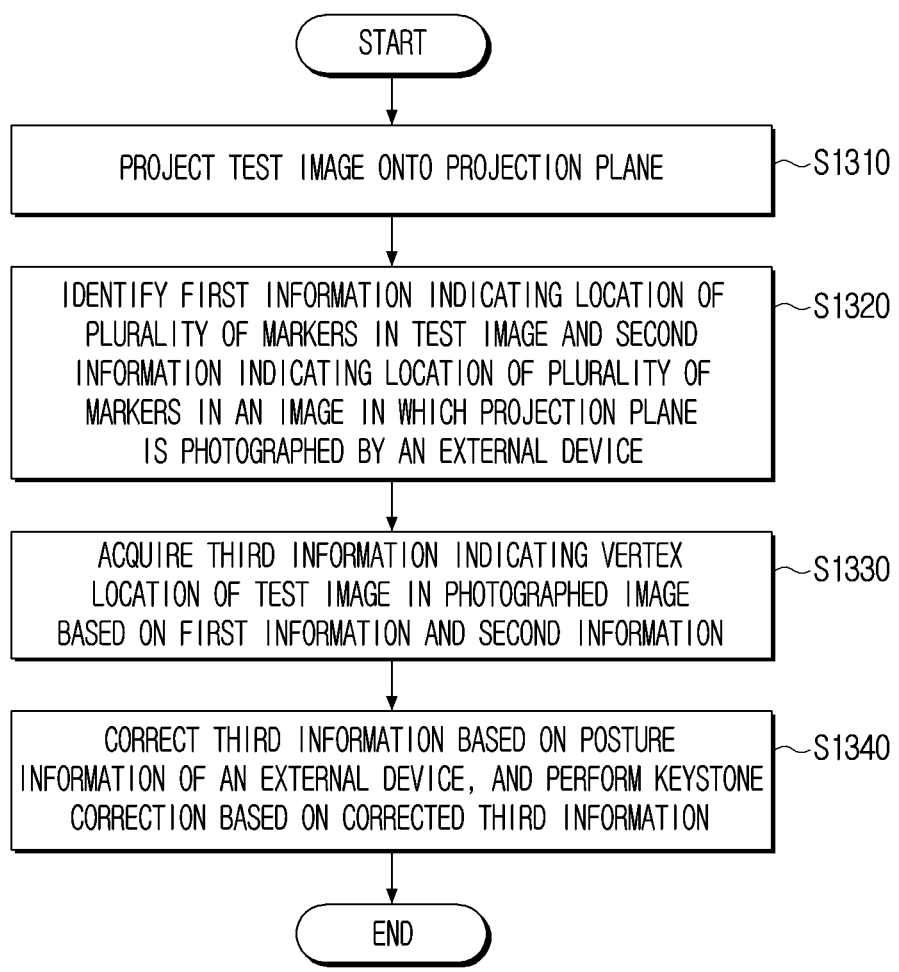

ELECTRONIC APPARATUS AND METHOD FOR CONTROLLING THEREOF

CROSS-REFERENCE TO RELATED APPLICATIONS

This application is a continuation of International Application No. PCT/KR2022/002569 designating the United States, filed on Feb. 22, 2022, in the Korean Intellectual Property Receiving Office and claiming priority to Korean Patent Application No. 10-2021-0070793, filed on Jun. 1, 2021, in the Korean Intellectual Property Office and Korean Patent Application No. 10-2021-0136104, filed on Oct. 13, 2021, in the Korean Intellectual Property Office, the disclosures of all of which are incorporated by reference herein in their entireties.

BACKGROUND

Field

The disclosure relates to an electronic apparatus and a method for controlling thereof. For example, the disclosure relates to an electronic apparatus for projecting an image and method for controlling thereof.

Description of Related Art

With the development of electronic and optical technologies, various projectors have been utilized. A projector refers to an electronic apparatus that projects light onto a projection plane (or a projection screen) to form an image on the projection plane.

When projecting an image using the projector, a rectangular image is displayed on the projection plane when the projector is placed on a flat plane in a direction of the projection plane. Otherwise, up-down and/or left-right distortion may occur, or a rotated image may appear on the projection plane. This distortion may be referred to as a keystone effect.

Conventionally, the projector photographs the projection plane using an image sensor, and calculates and uses a tilted angle between the projection plane and the projector by processing the photographed image. In this case, a correction process for aligning the projection plane of the projector with a measurement axis of the image sensor should be performed, but if an error occurs during the correction process, it may greatly affect a calculation of an angle. Also, the process of processing images photographed by the image sensor also requires a large amount of calculation. In addition, when the keystone corrected image is projected onto the projection plane, a size of the image may vary according to the distance between the projection plane and the projector. Conventionally, there was also a problem that it is difficult to adjust the keystone corrected image to the size of the projection plane.

SUMMARY

Embodiments of the disclosure provide an electronic apparatus configured to perform accurate keystone correction by reflecting posture information of an external device when keystone correction is performed based on an image photographed by an external device.

According to an example embodiment of the disclosure, an electronic apparatus includes: an image projector, and a processor configured to: control the image projector to project a test image including a plurality of markers onto a projection plane, based on first information indicating a location of the plurality of markers in the test image and second information indicating a location of the plurality of markers in an image of the projection plane photographed by an external device, acquire third information indicating a location of a vertex of the test image in the photographed image, correct the third information based on posture information of the external device, and perform keystone correction based on the corrected third information.

The processor may be configured to correct the third information to be rotated based on the posture information of the external device, and based on distance information between the external device and the projection plane, correct the third information that has been corrected to be rotated, to be projected, and acquire the corrected third coordinate information.

The posture information of the external device may include at least one of roll information, pitch information, or yaw information, wherein the roll information and the pitch information are acquired through an acceleration sensor provided in the external device, and wherein the yaw information is configured to be acquired based on view angle information of a camera used for photographing the projection plane in the external device.

The processor may, based on the projection plane being identified as a predetermined (e.g., specified) area based on the posture information of the external device, acquire at least one of the roll information, the pitch information, or the yaw information by changing a reference value of a gravity direction among output values of the acceleration sensor, and correct the third coordinate information based on the acquired information.

Each of the plurality of markers may be in a pattern form including a black area and a white area with a predetermined (e.g., specified) ratio in each of a plurality of directions.

Each of the plurality of markers is configured to be located in an inner area by the predetermined (e.g., specified) ratio based on four vertices of the test image, wherein the processor is configured to: acquire fourth information indicating a vertex location of the test image based on the first information and the predetermined (e.g., specified) ratio, and acquire the third information from the photographed image based on the fourth information and a first transformation matrix, wherein the first transform matrix is acquired based on a mapping relationship between the first information and the second information.

The processor may be configured to: acquire a second transformation matrix based on the corrected third information and vertex coordinate information of the test image, and perform keystone correction by identifying a rectangular area having a maximum size corresponding to an aspect ratio of an input image within the identified area based on the corrected third information.

The processor may be configured to: acquire fifth information corresponding to the identified rectangular area, and perform keystone correction by applying an inverse matrix of the second transformation matrix to the acquired fifth coordinate information.

The processor may be configured to: expand the rectangle at a center point diagonally meeting a vertex of a first area acquired based on the corrected third information, and identify whether a vertex of the expanded rectangle meets an edge of the first area, based on a vertex of the rectangle meeting the edge of the first area, expand a small side of the rectangle in a predetermined (e.g., specified) pixel unit, and expand a large side of the rectangle to correspond to the aspect ratio, and identify the rectangular area having the maximum size at a location where the vertex corresponding to a diagonal of the rectangle meets the edge of the first area.

The apparatus may further include a communication interface comprising communication circuitry, wherein the processor is configured to: receive the second information indicating the location of the plurality of markers from the external device through the communication interface, and acquire the second information indicating the location of the plurality of markers based on the photographed image received from the external device through the communication interface.

The plurality of markers may be located in a plurality of different areas in the test image for correcting a distortion of the projection plane, and may have different shapes for identifying a location corresponding to each of the plurality of markers.

According to an example embodiment of the disclosure, a method for controlling an electronic apparatus includes: projecting a test image including a plurality of markers onto a projection plane, based on first information indicating a location of the plurality of markers in the test image and second information indicating a location of the plurality of markers in an image of the projection plane photographed by an external device, acquiring third information indicating a location of a vertex of the test image in the photographed image, correcting the third information based on posture information of the external device, and performing keystone correction based on the corrected third information.

The correcting the third information may include: correcting rotation of the third information based on the posture information of the external device, and based on distance information between the external device and the projection plane, correcting the third information that has been corrected to be rotated, to be projected, and acquiring the corrected third coordinate information.

The posture information of the external device includes at least one of roll information, pitch information, or yaw information, wherein the roll information and the pitch information are acquired through an acceleration sensor provided in the external device, and wherein the yaw information is acquired based on view angle information of a camera used for photographing the projection plane in the external device.

The performing the keystone correction may include, based on the projection plane being identified as a predetermined (e.g., specified) area based on the posture information of the external device, acquiring at least one of the roll information, the pitch information, or the yaw information by changing a reference value of a gravity direction among output values of the acceleration sensor, and correcting the third coordinate information based on the acquired information.

Each of the plurality of markers may be in a pattern form including a black area and a white area with a predetermined (e.g., specified) ratio in each of a plurality of directions.

Each of the plurality of markers may be located in an inner area by the predetermined (specified) ratio based on four vertices of the test image, wherein the method further includes: acquiring fourth information indicating a vertex location of the test image based on the first information and the predetermined ratio, and acquiring the third information from the photographed image based on the fourth information and a first transformation matrix, wherein the first transform matrix is acquired based on a mapping relationship between the first information and the second information.

The performing keystone correction may include: acquiring a second transformation matrix based on the corrected third information and vertex coordinate information of the test image, and performing keystone correction by identifying a rectangular area having a maximum size corresponding to an aspect ratio of an input image within the identified area based on the corrected third information.

The performing keystone correction may include: acquiring fifth information corresponding to the identified rectangular area, and performing keystone correction by applying an inverse matrix of the second transformation matrix to the acquired fifth coordinate information.

The performing keystone correction may include: expanding the rectangle at a center point diagonally meeting a vertex of a first area acquired based on the corrected third information, and identifying whether a vertex of the expanded rectangle meets an edge of the first area, based on a vertex of the rectangle meeting the edge of the first area, expanding a small side of the rectangle in a predetermined (e.g., specified) pixel unit, and expanding a large side of the rectangle to correspond to the aspect ratio, and identifying the rectangular area having the maximum size at a location where the vertex corresponding to a diagonal of the rectangle meets the edge of the first area.

The acquiring the second information may include: receiving the second information indicating the location of the plurality of markers from the external device through a communication interface, and acquiring the second information indicating the location of the plurality of markers based on the photographed image received from the external device through the communication interface.

The plurality of markers may be located in a plurality of different areas in the test image for correcting a distortion of the projection plane, and may have different shapes for identifying a location corresponding to each of the plurality of markers.

According to various example embodiments, accurate keystone correction by reflecting posture information of an external device may be performed when keystone correction is performed based on an image photographed by an external device. Accordingly, user convenience may be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13 is a flowchart illustrating an example method of controlling an electronic apparatus according to various embodiments.

DETAILED DESCRIPTION

Figure 1A:
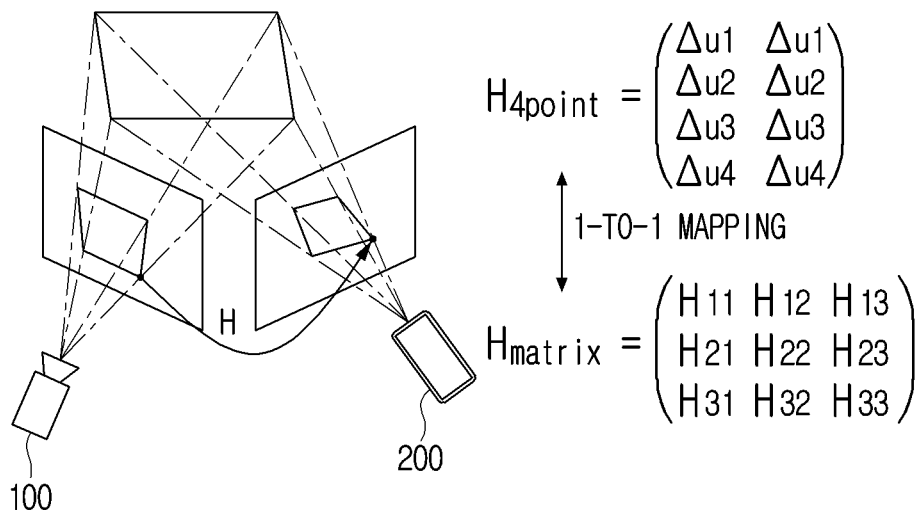
FIGS. 1A and 1B are diagrams illustrating an example keystone correction method and a concept of a coordinate system for better understanding.
Figure 1A:
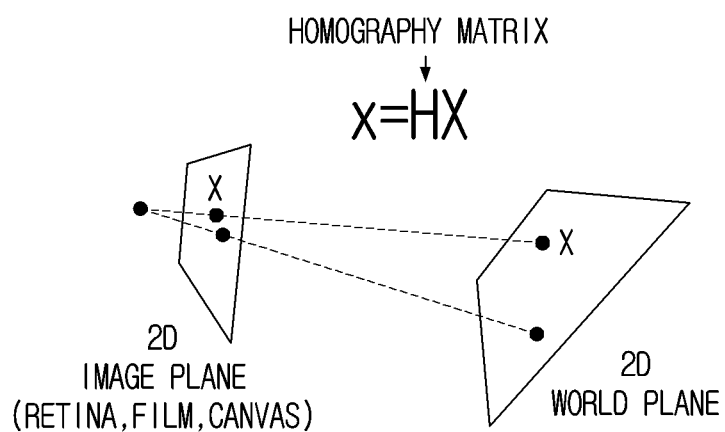

Hereinafter, the disclosure will be described in greater detail with reference to the accompanying drawings.

The terms used in describing the various example embodiments will be briefly explained, and example embodiments will be described in greater detail with reference to the accompanying drawings.

Terms used in the disclosure are selected as general terminologies currently widely used in consideration of the configuration and functions of the disclosure, but may be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The terms "have", "may have", "include", and "may include" used in the example embodiments of the present disclosure indicate the presence of corresponding features (for example, elements such as numerical values, functions, operations, or parts), and do not preclude the presence of additional features.

The term "at least one of A or/and B" may refer, for example, to at least one A, including at least one B, or including both at least one A and at least one B.

The term such as "first" and "second" used in various example embodiments may be used to reference various elements regardless of an order and/or importance of the corresponding elements, and does not limit the corresponding elements.

When an element (e.g., a first element) is "operatively or communicatively coupled with/to" or "connected to" another element (e.g., a second element), an element may be directly coupled with another element or may be coupled through the other element (e.g., a third element).

In the description, the term "configured to" may be used interchangeably with, for example, "suitable for", "having the capacity to", "designed to", "adapted to", "made to", or "capable of" under certain circumstances. The term "configured to (set to)" does not necessarily refer to "specifically designed to" in a hardware level.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' may perform at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Hereinafter, various example embodiments of the disclosure will be described in greater detail with reference to the accompanying drawings.

Figure 1B:
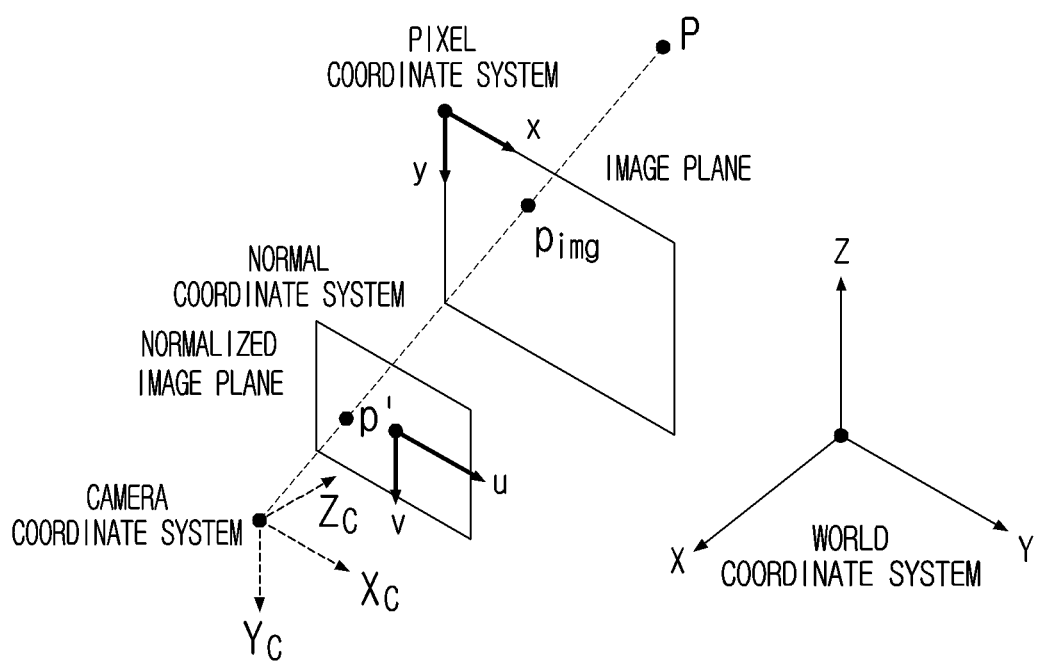

FIGS. 1A and 1B are diagrams illustrating an example keystone correction method and a concept of a coordinate system for better understanding.

The electronic apparatus 100 having a function of projecting an image, that is a projector function, shows a relatively accurate ratio of a screen when the projector is located on a straight line with the projection plane, but when this is not satisfied due to space conditions, the electronic apparatus 100 projects a screen that deviates from the projection plane or a rhombus-shaped screen that is distorted up, down, right and left. In this case, a keystone correction may be required. Keystone correction may refer, for example, to a function of adjusting a projected screen to be closer to an original shape of a rectangle by forcibly moving an edge of the screen to be displayed, that is, to be projected.

According to an embodiment, keystone correction may be performed using a user terminal 200 as illustrated in FIG. 1A. For example, a projection plane 10 on which an image is projected may be photographed using a camera provided in the user terminal 200, and keystone correction may be performed based on the photographed image. A projective transformation may be used. Projective transformation may refer, for example, to a transformation of an image projected from 3D space into 2D space. In other words, it is a method of transforming two images viewed from two different points of view in 3D space. A matrix that represents the relationship between two different images may be called a homography matrix (hereinafter referred to as H matrix). For example, a size of H matrix may be 3×3. Four corresponding pair coordinates may be required to acquire the H matrix. According to an embodiment, the four corresponding pair coordinates may be coordinates on a world coordinate system.

FIG. 1B is a diagram illustrating an example concept of a coordinate system for better understanding.

As illustrated in FIG. 1B, there are four coordinate systems in an image geometry which are a world coordinate system, a camera coordinate system, a normal coordinate system, and a pixel coordinate system. The world coordinate system and the camera coordinate system are three-dimensional coordinate systems, and the normal coordinate system and the pixel coordinate system are two-dimensional coordinate systems.

The world coordinate system is a coordinate system used to represent a location of an object. The world coordinate system is a coordinate system that may be arbitrarily used, for example, an edge of a space may be set as an origin point, a direction of one wall may be set as an X-axis, a direction of the other wall may be set as an Y-axis, and a direction facing the sky may be set as an Z-axis. A point on the world coordinate system may be represented as P (X, Y, Z).

Figure 4A:
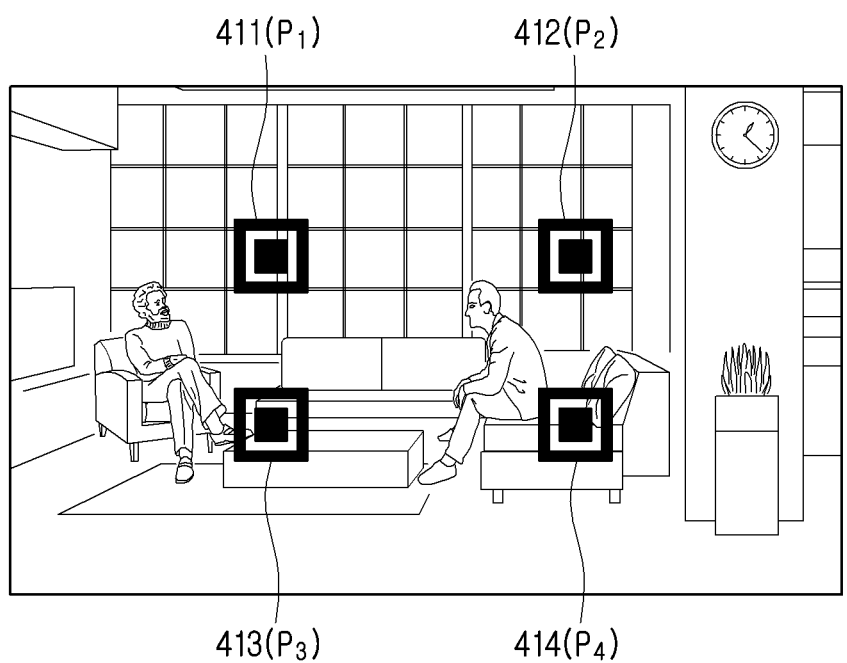
FIGS. 4A and 4B are diagrams illustrating example coordinate information according to various embodiments.
Figure 4B:
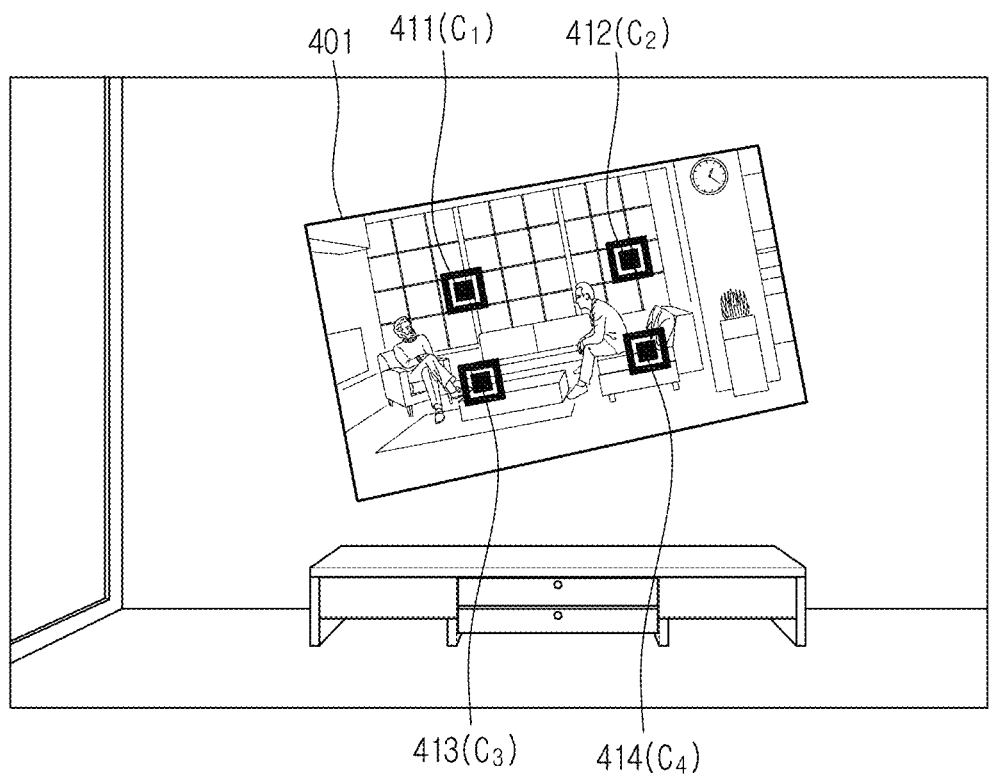

The camera coordinate system is a coordinate system with respect to a camera. As illustrated in FIGS. 4A and 4B, for example, the camera coordinate system may set a focus of the camera (center of a lens) as an origin point, a front optical axis direction of the camera as an Z-axis, a downward direction of the camera as an Y-axis, and a right direction as an X-axis. Points on the camera coordinate system may be represented as Pc (Xc, Yc, Zc).

The pixel image coordinate system may be called an image coordinate system. As illustrated in FIG. 4B, the pixel coordinate system may be a coordinate system for an image viewed by an actual eye, and an upper left edge of the image may be set as an origin point, a right direction as an x-axis increasing direction, and a downward direction as an y-axis increasing direction. A plane determined by the x-axis and y-axis of the pixel coordinate system is called an image plane.

Geometrically, a point P=(X, Y, Z) in 3D space may passes through a focus of a camera (or a focus of a lens) and be projected to a point $p_{img}$=(x, y) of an image plane. All 3D points on a ray connecting point P and point $p_{img}$ may all be projected as $p_{img}$. Thus, $p_{img}$ from the 3D point P may be uniquely determined, but conversely, it may be impossible to acquire P from the image pixel $p_{img}$ without additional information. A unit of the pixel coordinate system is a pixel, and may be represented as $p_{img}$=(x, y).

The normalized image coordinate system may be an image coordinate system that eliminates and/or reduces an influence of internal parameters of the camera. In addition, the normal coordinate system is a coordinate system in which the units of the coordinate system are removed (normalized) and is a coordinate system that defines a virtual image plane with a distance of 1 from a focus of the camera. In other words, it may be an image plane shifted to a point where a distance from the camera focus is 1 by translating an original image plane in parallel. An origin point of the normal coordinate system is a midpoint of the image plane (intersection with an optical axis Zc). Points on the normal coordinate system may be represented as p'=(u, v). Even if a same scene is photographed at a same location and a same angle, different images may be acquired depending on a camera used or a camera setting. A normalized image plane may be used since it is more effective to analyze and theorize common geometric characteristics in a normalized image plane that removes these elements described above.

When the keystone correction for an image projected by the electronic apparatus 100 is performed based on an image photographed using a camera provided in the user terminal 200, it may be difficult to perform accurate keystone correction when a posture of the user terminal 200 is incorrect.

Accordingly, various embodiments for performing accurate keystone correction based on posture information of the user terminal 200 and a predetermined (e.g., specified) pattern image are described below.

Figure 2:
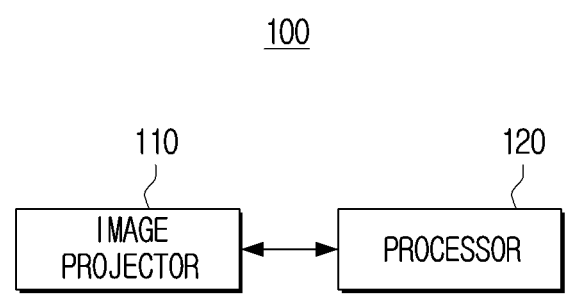
FIG. 2 is a block diagram illustrating an example configuration of a projector according to various embodiments.

FIG. 2 is a block diagram illustrating an example configuration of an electronic apparatus according to various embodiments.

According to FIG. 2, the electronic apparatus 100 may include an image projector 110 and at least one processor (e.g., including processing circuitry) 120. The electronic apparatus 100 may, for example, be implemented as a projector for projecting an image onto a wall or a projection plane or various types of devices having an image projection function.

The image projector 110 may perform a function of outputting an image to the projection plane by projecting light for representing an image to the outside. Here, the projection plane may be a part of a real world space from which the image is output or a separate projection plane. The image projector 110 may include various detailed configurations such as at least one light source among, for example, and without limitation, a lamp, an LED, and a laser, a projection lens, a reflector, or the like.

The image projector 110 may project an image in one of various projection methods (e.g., a cathode-ray tube (CRT) method, a liquid crystal display (LCD) method, a digital light processing (DLP) method, a laser method, or the like). The image projector 110 may include at least one light source.

The image projector 110 may, for example, and without limitation, output images in 4:3 aspect ratio, 5:4 aspect ratio, 16:9 wide aspect ratio according to a purpose of the electronic apparatus 100 or the user's settings, and may output images in various resolutions such as WVGA (854*480), SVGA (800*600), XGA (1024*768), WXGA (1280*720), WXGA (1280*800), XGA (1280*1024), UXGA (1600*1200), Full HD (1920*1080), or the like.

In addition, the image projector 110 may perform various functions for adjusting a projection image under the control of the processor 120. For example, the image projector 110 may perform a zoom function, a lens shift function, or the like.

At least one processor 120 (hereinafter referred to as a processor) may include various processing circuitry and be electrically connected to the image projector 110 and control the overall operation of the electronic apparatus 100. The processor 120 may include one or more processors. For example, the processor 120 may perform an operation of a display device 100 according to various embodiments of the disclosure by executing at least one instruction stored in a memory (not illustrated).

According to an embodiment, the processor 120 may be implemented, for example, and without limitation, as a digital signal processor (DSP), a microprocessor, a graphics processing unit (GPU), an artificial intelligence (AI), a neural processing unit (NPU), a timing controller (T-CON) that processes a digital image signal, or the like. However, it is not limited thereto, and may include, for example, and without limitation, one or more of a central processing unit (CPU), a dedicated processor, microcontroller unit (MCU), micro processing unit (MPU), controller, application processor (AP), or communication processor (CP), ARM processor, or may be defined with a corresponding term. In addition, the processor 140 may be implemented as a system on chip (SoC), large-scale integration (LSI), with a built-in processing algorithm, or may be implemented in the form of application specific integrated circuit (ASIC) and field programmable gate array (FPGA).

The processor 120 may control the image projector 110 such that each of a plurality of markers (or tags) projects a test image included in a different area to a projection plane. For example, the test image may be an image including only a plurality of markers. However, the test image may include other images in addition to the plurality of markers, but other images (e.g., background images) may be included so as not to overlap locations including the plurality of markers.

According to an embodiment, each of the plurality of markers may be in a form of a pattern including a black area and a white area with a predetermined ratio in each of a plurality of directions.

According to an embodiment, the plurality of markers may be located at a predefined location, for example, an area within a threshold distance from four vertices of the test image of the image. For example, the plurality of markers may be located in an inner area by a predetermined ratio based on a size of an entire image based on the four vertices of the test image.

FIGS. 3A, 3B, 3C, 3D and 3E are diagrams illustrating example test images according to various embodiments.

Figure 3A:
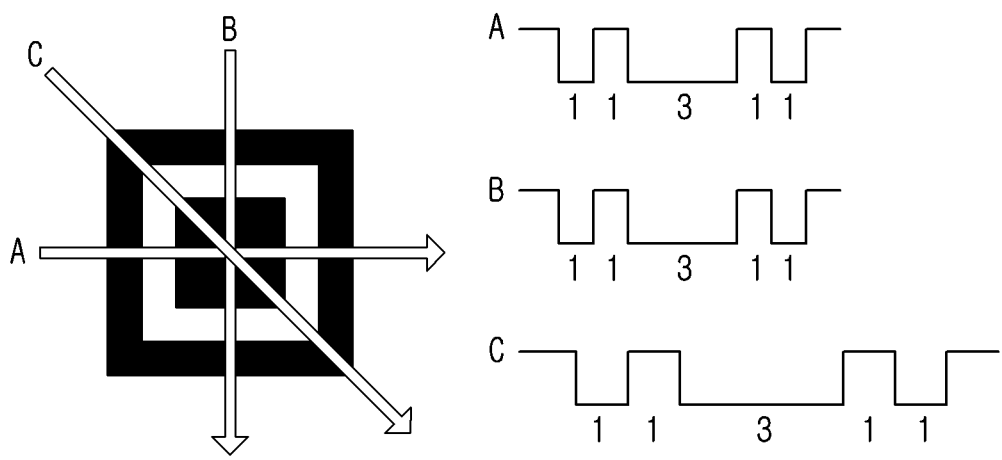
FIGS. 3A, 3B, 3C, 3D, and 3E are diagrams illustrating examples of a test image according to various embodiments.

FIG. 3A is a diagram illustrating an example shape of a marker (or tag) according to an embodiment. The marker may be replaced with various terms such as tags, patterns, or the like. The marker may be a predetermined (e.g., specified) ratio of the black area and the white area in a plurality of directions, for example, left and right, up and down, and diagonal directions. For example, as illustrated, a ratio of a white pixel to a black pixel may be 1:1:3:1:1 in any direction of A, B, and C. In this case, the markers may be identified in all 360° directions. However, numerical values are only an example, as well as being variously changeable, such as 1:2:3:2:1 or 1:1:1:4:1:1. In other words, if a pattern is a predetermined (as used in the disclosure, the term "predetermined" may be used interchangeably with the term "specified") pattern in the electronic apparatus 100 for projecting the test image including the marker and a device for identifying a location of the marker in the photographed image (e.g., electronic apparatus 100 or user terminal 200), the ratio may be changed in any form.

Figure 3B:
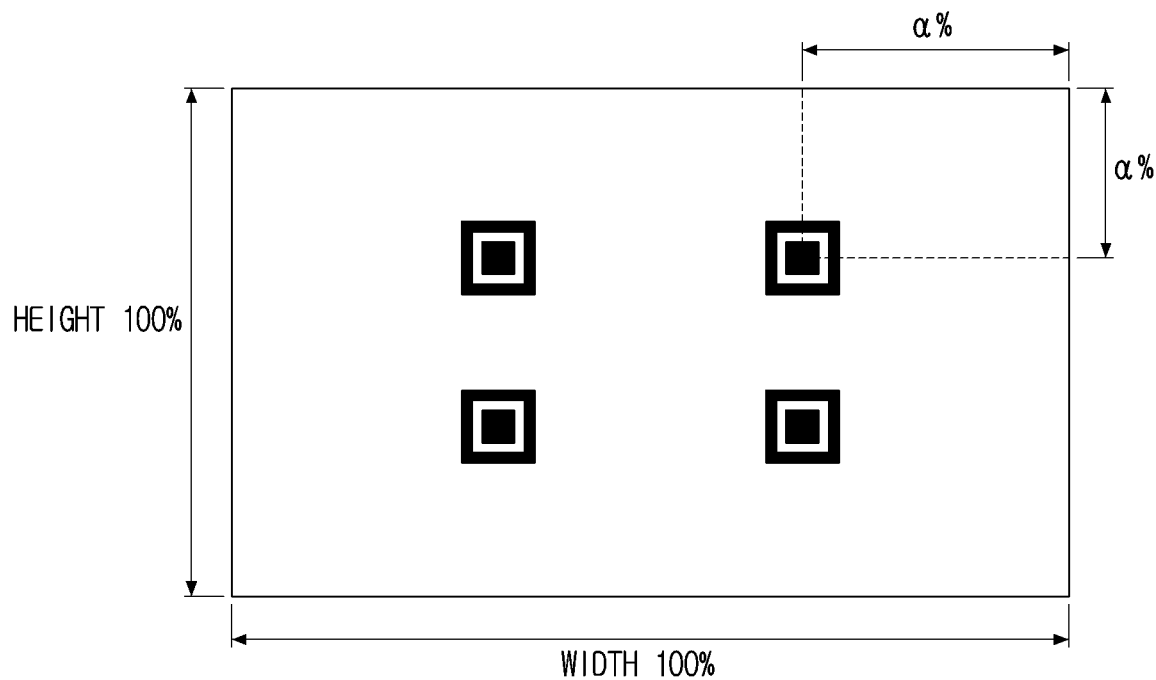

FIG. 3B is a diagram illustrating an example location of a marker according to various embodiments.

A location of a marker in a test image may be a previously known location which is at least one of the electronic apparatus 100 for projecting the test image, the electronic apparatus 100 for analyzing a photographed image, or the user terminal 200. However, the electronic apparatus 100 may transmit corresponding location information to the other apparatus, or the other apparatus may receive the corresponding location information through an external server. For example, as illustrated in FIG. 3B, the plurality of markers may be located in an inner area of alpha % in vertical and horizontal directions from four vertices of the image.

Figure 3C:
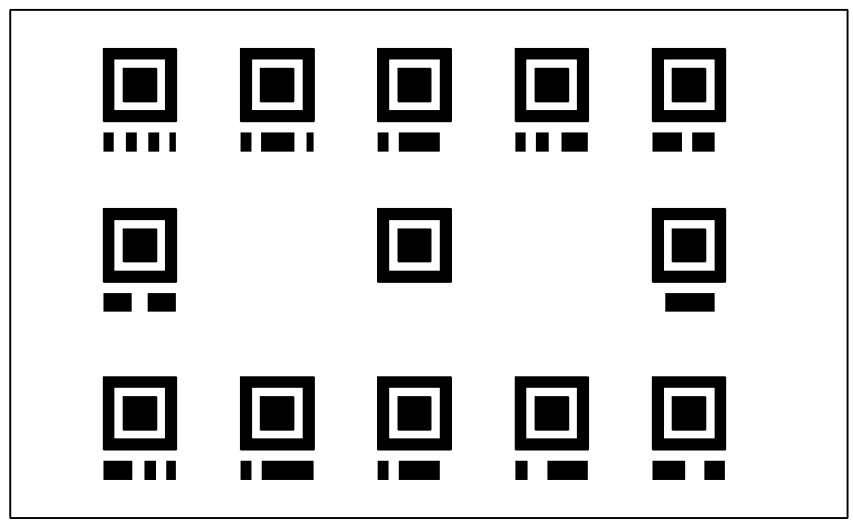

FIG. 3C is a diagram illustrating an example location of a marker according to various embodiments.

According to an embodiment, when there is distortion on a projection plane, the distortion of the projection plane may not be identified or corrected by coordinates of the four points. In this case, a plurality of markers located in various areas may be used as illustrated in FIG. 3C. However, in this case, each marker may need to be of a different shape to identify which location each marker corresponds to. Accordingly, markers of various shapes may be used as location markers as illustrated in FIG. 3C. As described above, when a distortion of a projection plane is identified using a plurality of markers, an image distortion caused by projection plane distortion may be solved by adjusting a location of an image projected to a distortion area or scaling a size of the image.

Figure 3D:
Figure 3E:
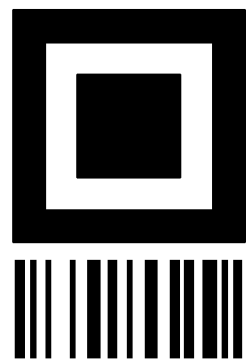

FIGS. 3D and 3E are diagrams illustrating example shapes of various markers according to various embodiments.

Accordingly, the marker may be designed similarly to a barcode and may be converted into an on/off digital code through black and white at a specific point, and thus it may be implemented to be easily identified which position the marker corresponds to. According to an embodiment, a distance of a marker indicating on/off or a location of on/off as illustrated in FIGS. 3D and 3E may also be freely adjustable.

Referring back to FIG. 2, the processor 120 may acquire first information indicating the location of a plurality of markers in a test image and second information indicating the location of a plurality of markers in an image in which a projection plane is photographed by an external device (hereinafter referred to as a photographed image). The external device may, for example, be a user terminal 200 shown in FIG. 1A, and the external device is described as a user terminal 200 herein below.

According to an embodiment, the processor 120 may acquire first information indicating the location of the plurality of markers in an original test image projected through the image projector 110.

In addition, the processor 120 may receive the second information from the user terminal 200 or acquire the second information based on the photographed image received from the user terminal 200. For example, the user terminal 200 may directly identify and transmit the second information indicating the location of the plurality of markers in the photographed image to the electronic apparatus 100, and the processor 120 may acquire the second information directly from the received photographed image.

For convenience of description, coordinates of the original test image are described in a projector coordinate system, and coordinates in the photographed image are described in a camera coordinate system. Accordingly, the first information may correspond to the projector coordinate system, and the second information may correspond to the camera coordinate system. For convenience of description, the first information and the second information are named as first coordinate information and second coordinate information.

FIGS. 4A and 4B are diagrams illustrating example coordinate information according to various embodiments.

FIG. 4A is a diagram illustrating first coordinate information of a plurality of markers 411, 412, 413, and 414 in an original test image, for example, a projector coordinate system, and the first coordinate information may be P1, P2, P3, and P4. For example, the first coordinate information may be calculated based on a specific point, for example, a center point, of the plurality of markers 411, 412, 413, and 414.

FIG. 4B is a diagram illustrating second coordinate information of the plurality of markers 411, 412, 413, and 414 in a photographed image 401, that is, a camera coordinate system, and the second coordinate information may be C1, C2, C3, and C4. For example, the second coordinate information may be calculated based on a specific point (the same point as the first coordinate information), for example, a center point, of the plurality of markers 411, 412, 413, and 414.

Referring back to FIG. 2, the processor 120 may acquire third information indicating a vertex area location of the test image in the photographed image based on the first coordinate information and the second coordinate information. Here, the vertex area may be four points where each edge area meets. The third information may be coordinate information of the camera coordinate system, and may be named as third coordinate information for convenience of description.

According to an embodiment, the processor 120 may acquire fourth information indicating the location of the vertex of the test image in the test image based on the first coordinate information and location information of a marker, and acquire third coordinate information in the photographed image based on a first H matrix. The fourth information may be coordinate information of the projector coordinate system, and may be named as fourth coordinate information for convenience of description.

In this case, the first H matrix may be acquired based on a mapping relationship between the first coordinate information and the second coordinate information. According to an embodiment, the processor 120 knows four coordinate pairs based on the first coordinate information P1, P2, P3, and P4 and the second coordinate information C1, C2, C3, and C4, such that the first H matrix may be acquired.

The processor 120 may transform the four vertex coordinates, for example, fourth coordinate information, into the camera coordinate system, for example, third coordinate information using the first H matrix in the projector coordinate. For example, the processor 120 may pre-store four vertex coordinate information, for example, fourth coordinate information of the projector coordinate system in a test image, or calculate four vertex coordinates, for example, fourth coordinate information of the projector coordinate system based on the first coordinate information.

For example, each of the plurality of markers may be located in an inner area by a predetermined ratio based on the four vertices of the test image. In this case, the processor 120 may acquire fourth coordinate information indicating a vertex location of the test image based on the first coordinate information indicating the location of the marker and a predetermined ratio. The fourth coordinate information may correspond to a projector coordinate system.

Figure 5:
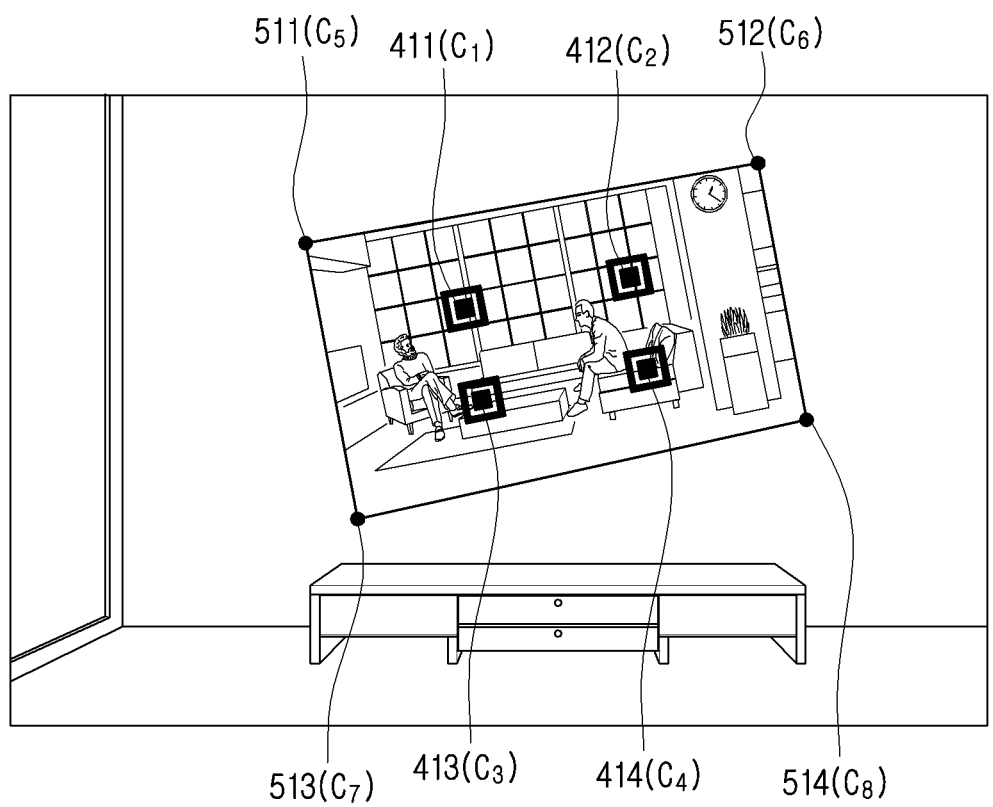
FIG. 5 is a diagram illustrating example third coordinate information according to various embodiments.

The processor 120 may acquire third coordinate information by transforming the four vertex coordinates (fourth coordinate information) into the camera coordinate system in the projector coordinate system using the first H matrix. For example, as illustrated in FIG. 5, the processor 120 may acquire third coordinate information C5, C6, C7, and C8, that is, third coordinate information of the camera coordinate system, corresponding to four vertices 511, 512, 513, and 514 of a projected image in a photographed image.

Referring back to FIG. 2, even though the processor 120 acquires third coordinate information indicating vertex location of the test image in the photographed image, since it is hard to be considered that the user terminal 100 has performed photographing in a correct posture, a correction for the third coordinate information may be required.

Accordingly, the processor 120 may correct the third coordinate information based on posture information of the user terminal 200. The posture information may include at least one of roll information, pitch information, or yaw information. According to an embodiment, the roll information and the pitch information may be acquired through an acceleration sensor provided in the user terminal 200. The yaw information may be acquired based on view angle information of the camera used for photographing a projection plane in the user terminal 200.

The processor 120 may correct third coordinate information based on distance information between the user terminal 200 and the projection plane as well as the posture information during correction. For example, the processor 120 may correct the third coordinate information to be rotated based on the posture information and correct the third coordinate information to be projected based on the distance information.

The following describes example rotation correction and projection correction methods.

Figure 6A:
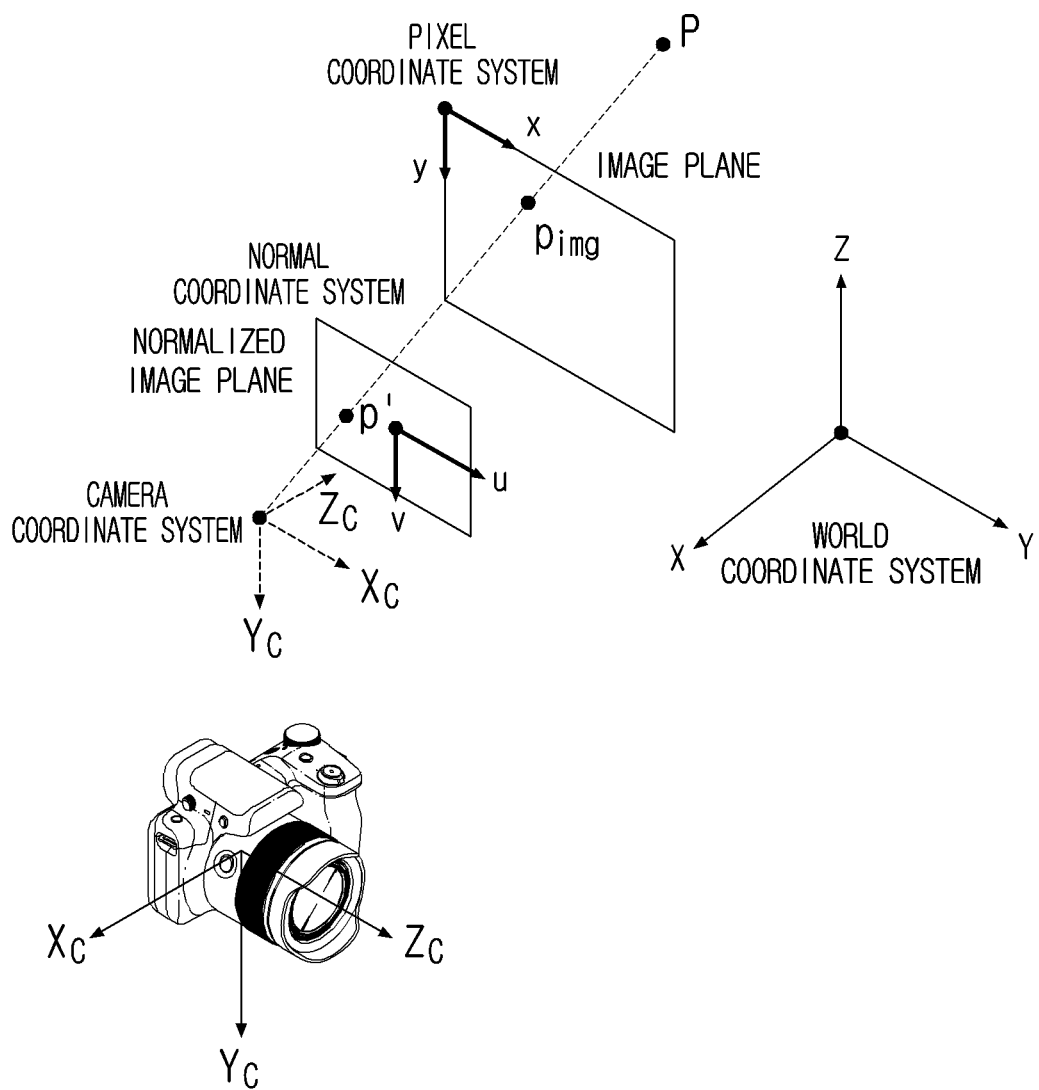
FIGS. 6A and 6B are diagrams illustrating an example acquisition method of roll information and pitch information according to various embodiments.
Figure 6B:
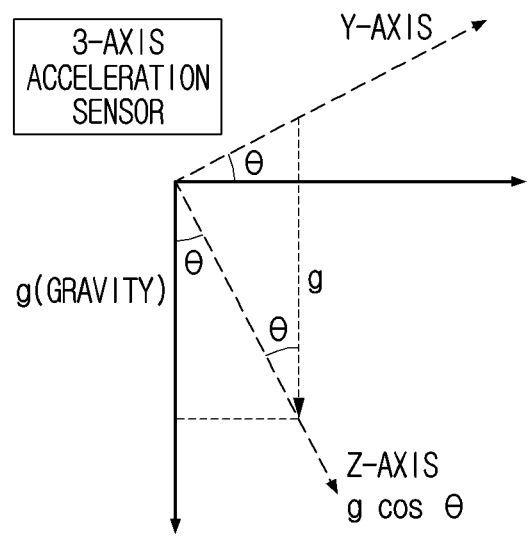

FIGS. 6A and 6B are diagrams illustrating an example acquisition method of roll information and pitch information according to various embodiments.

According to an embodiment, if Xc, Yc, and Zc axes are defined based on the user terminal 200 as illustrated in FIG. 6A, a roll angle φ rotating around y-axis and pitch angle θ rotating around an x-axis may be defined as follows.

$$\varphi = \mathrm{atan}\left(\frac{A_Y}{\sqrt{A_X^2 + A_Z^2}}\right) \quad \text{[Equation 1]}$$

$$\theta = \mathrm{atan}\left(\frac{A_X}{\sqrt{A_Y^2 + A_Z^2}}\right) \quad \text{[Equation 2]}$$

In Equation 1, A X, A Y, A Z are the x-axis, y-axis, and z-axis acceleration values of an acceleration sensor provided in the user terminal 200, respectively. For example, a pitch angle θ may be calculated based on a relationship as illustrated in FIG. 6B.

Figure 7:
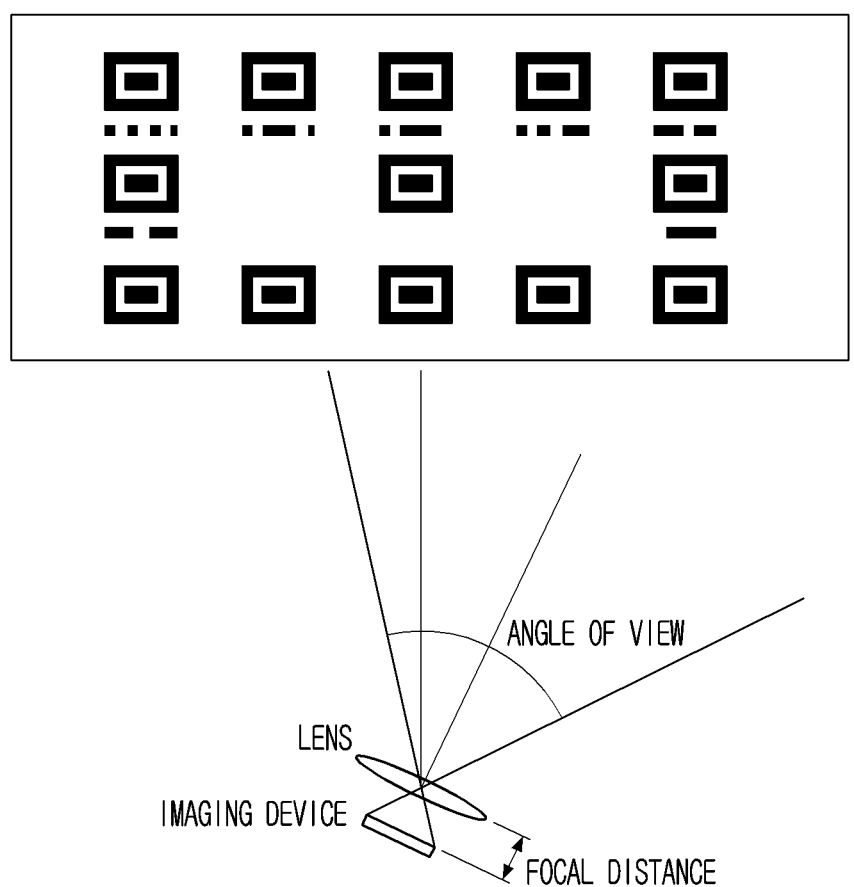
FIG. 7 is a diagram illustrating an example method of acquiring yaw information according to various embodiments.

FIG. 7 is a diagram illustrating an example method of acquiring yaw information according to various embodiments.

Posture information related to a direction of gravity, for example, roll information and pitch information may be acquired using an output value of the acceleration sensor (or gravity sensor) as described above, but yaw information not related to the direction of gravity may be acquired using a geomagnetic sensor, a gyro sensor or the like based on a direction arbitrarily designated by the user. However, when the gyro sensor or the like is not used, the yaw information may be acquired based on the view angle information of the camera. For example, the processor 120 may acquire coordinates of a center point of the projected image in the camera coordinate system based on third coordinate information C5, C6, C7, and C8 corresponding to the four vertices 511, 512, 513, and 514 of the projected image in the photographed image. The processor 120 may acquire a pixel distance value between the center point coordinates of the projected image and the center point coordinates of the photographed image. Thereafter, the processor 120 may acquire a camera rotation angle based on whole view angle: whole pixel=camera rotation angle: pixel distance value. For example, if whole angle of view is 80′, a whole pixel is 4000 px, and a pixel distance value is 500 px, a camera rotation angle 10′ may be acquired based on 80′:4000 px=camera rotation angle: 500 px.

According to an embodiment, if it is identified that a projection plane is a predetermined area based on posture information of the external device 200, the processor 120 may acquire at least one of roll information, pitch information, and yaw information by changing a reference value of a gravity direction among output values of the acceleration sensor.

For example, an image may be projected by turning 90 degrees even if the projection plane is a ceiling or a wall plane other than a general wall plane in the same or similar direction as the gravity direction. In this case, the processor 130 may acquire at least one of roll information, pitch information, or yaw information by changing the reference value in the gravity direction among output values of the acceleration sensor. For example, if the reference value in the gravity direction among the output values of the acceleration sensor is an x-axis value based on a case in which the projection plane is a general wall plane, the reference value in the gravity direction may be changed to a y-axis value or a z-axis value when the projection plane is a ceiling, and at least one of roll information, pitch information, or yaw information may be acquired. In this case, if the x-axis value of the gravity direction reference value is more than a threshold value, the processor 130 may determine that the projection plane is a ceiling rather than a general wall plane, or when projecting an image by turning 90 degrees even if it is a wall plane. Accordingly, a calculation error due to the posture information of the external device 200 may be prevented and/or reduced when projecting the image by turning 90 degrees even if the projection plane is a ceiling rather than a general wall plane or a wall plane.

Referring back to FIG. 2, according to an embodiment, the processor 120 may acquire distance information between the user terminal 200 and the projection plane.

According to an embodiment, the processor 120 may acquire distance information to a virtual plane in pixel units on which a camera image is projected rather than an actual projection plane. Here, the virtual plane in pixel units may be a pixel coordinate system described in FIG. 1B.

According to an embodiment, when the user terminal 200 is equipped with a distance sensor (e.g., ToF sensor), and if a distance (z-axis value) of each vertex may be known from the user terminal 200, a real world distance of the z-axis may be calculated in px units and a z-axis value may be scaled in px units. Since the distance between the x-axis and y-axis pixels may be identified through a photographed image, and the corresponding real world distance may be identified based on the ToF sensor, a ratio between the px unit and the real world distance may be calculated using the same to calculate the z-axis as px.

According to another example, when the user terminal 200 does not have a distance sensor and view angle information of a camera is known, distance information may be acquired based on the view angle information of a lens (sensor). For example, the view angle information of the lens may be acquired from an exchangeable image file format (EXIF).

Figure 8A:
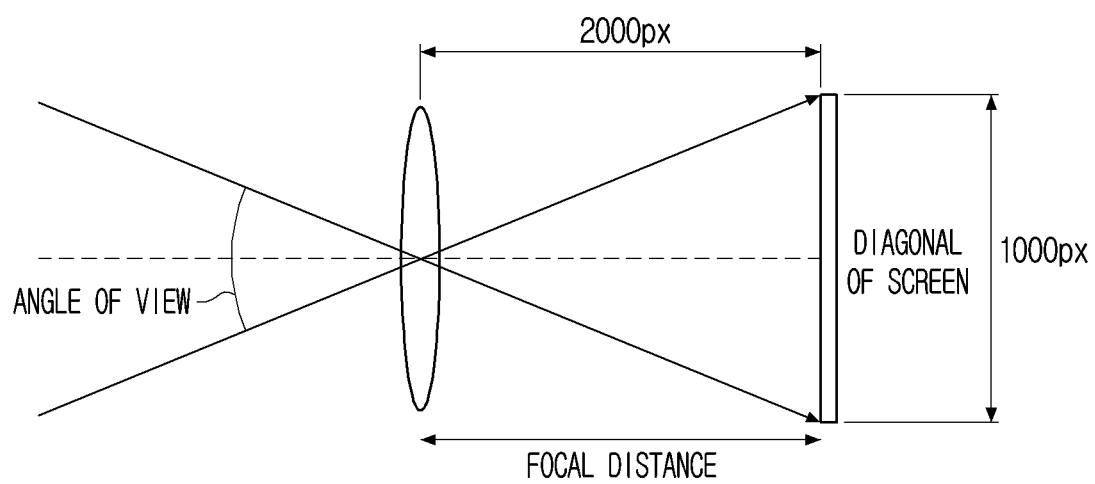
FIGS. 8A and 8B are diagrams illustrating an example distance acquisition method between a user terminal and a projection plane according to various embodiments.

For example, a real world ratio of a focal distance and a screen diagonal may be fixed according to a view angle as illustrated in FIG. 8A. The diagonal of the screen may be acquirable based on the number of diagonal pixels, and a distance to an object may correspond to the focal distance. In other words, if two points of an imaging object are 1000 px on an xy plane, a diagonal of the screen is 2000 px, and a ratio of a focal distance and a screen diagonal is 2:1, a distance value of z-axis value from the camera of two points on the xy plane is 2:1=x:2000, and the distance value may be 4000 px. In other words, the xy plane may be 4000 px away from the camera on the z-axis.

According to another example, a view angle is not known at all since there is no ToF sensor in the camera and no information such as focal distance, or the like, an error may be taken into consideration and calculation may be performed by inputting about 75 degrees, which is a lens field of view generally used in a user terminal.

Figure 8B:
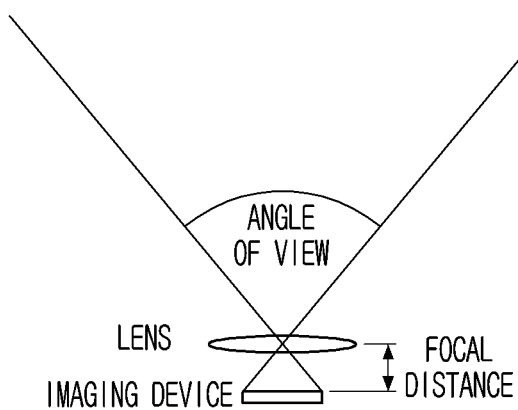
Figure 8B:
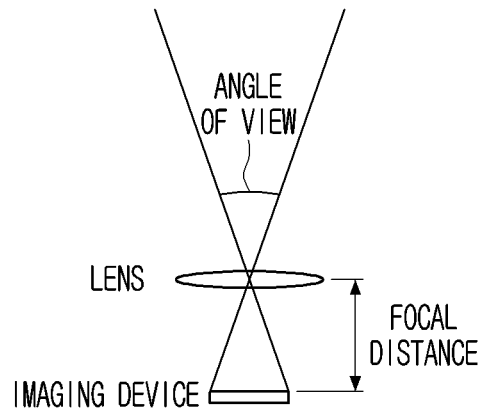

According to an embodiment, information on the camera may be received through an external server. For example, a camera manufacturer or a keystone correction service provider may store information on the camera in a cloud server or the like. In this case, the electronic apparatus 100 may receive camera's angle of view information from the external server. For example, the camera's angle of view information may include information such as sensor size, focal distance, or the like. As illustrated in FIG. 8B, the focal distance and the camera's angle of view may be inversely proportional. In other words, the shorter the focal distance, the wider the field of view, and the longer the focal distance, the narrower the field of view.

Referring back to FIG. 2, when posture information of the user terminal 200 and distance information between the user terminal 200 and the projection plane are acquired, the processor 120 may correct the third coordinate information based on the acquired information.

For example, the processor 120 may correct the third coordinate information to be rotated based on the posture information of the user terminal 200, correct the third coordinate information that has been corrected to be rotated, to be projected based on distance information, and acquire the corrected third coordinate information.

The photographed image recognizes coordinates of the projection plane of the camera, but in fact, it is not known how the projected plane of the projector image is located in three dimensions, and thus 3D rotation correction is necessary. However, if there is the ToF sensor, it may be known, but it is assumed that the ToF sensor is not used. In addition, a method of generating a virtual image may be used by assuming that the projection plane is not tilted after correction and is perpendicular to user gravity. For example, it is assumed four virtual points a1, a2, a3, and a4 are generated and their Z-axis values are all the same. In this case, posture information, that is, an inverse of roll, pitch and yaw values, may be applied as correction values and acquire point angles b1, b2, b3, and b4 points of the camera imaging plane and the inclined relational plane. A transformation formula from a plane including b1, b2, b3, b4 points to a plane including a1, a2, a3, and a4 points is acquired. Specifically, a transformation formula for rotational transformation such as the following Equation 3 may be acquired.

$$R_{XYZ \to xyz} = R_\psi R_\theta R_\phi \qquad \text{[Equation 3]}$$

$$= \begin{bmatrix} \cos\psi & \sin\psi & 0 \\ -\sin\psi & \cos\psi & 0 \\ 0 & 0 & 1 \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} 1 & 0 & 0 \\ 0 & \cos\phi & \sin\phi \\ 0 & -\sin\phi & \cos\phi \end{bmatrix}$$

$$= \begin{bmatrix} \cos\psi & \sin\psi & 0 \\ -\sin\psi & \cos\psi & 0 \\ 0 & 0 & 1 \end{bmatrix} \begin{bmatrix} \cos\theta & \sin\theta\sin\phi & -\sin\theta\cos\phi \\ 0 & \cos\phi & \sin\phi \\ \sin\theta & -\cos\theta\sin\phi & \cos\theta\cos\phi \end{bmatrix}$$

$$= \begin{bmatrix} \cos\psi\cos\theta & \cos\psi\sin\theta\sin\phi + \sin\phi\cos\phi & -\cos\psi\sin\theta\cos\phi + \sin\psi\sin\phi \\ -\sin\psi\cos\theta & -\sin\psi\sin\theta\sin\phi + \cos\psi\cos\phi & \sin\psi\sin\theta\cos\phi + \cos\psi\sin\phi \\ \sin\theta & -\cos\theta\sin\phi & \cos\theta\cos\phi \end{bmatrix}$$

Based on Equation 3, the processor 120 may correct third coordinate information to be rotated and acquire the third coordinate information that has been corrected to be rotated. Accordingly, the third coordinate information that has been corrected to be rotated, that is, coordinates for points in three dimensions, may be acquired.

The processor 120 may calculate how the 3D coordinates acquired through the rotation correction described above is to be projected onto an actual camera imaging plane. In other words, the processor 120 may correct the 3D coordinates to be projected that is acquired through the rotation correction, and acquire a final corrected third coordinate information. Referring to FIG. 1B, a point on 3D on the camera coordinate system may be projected onto the imaging plane along a virtual vanishing point line through the camera sensor. Accordingly, the processor 120 may calculate how a point on the 3D camera coordinate system will be projected onto a 2D imaging plane, e.g., a two-dimensional normal coordinate system.

For example, if a projection reference point is set as an origin point, the transformation formula for projecting the point P in 3D to p' may be given as illustrated in Equation 4.

$$s \begin{vmatrix} u \\ v \\ 1 \end{vmatrix} = \begin{bmatrix} 1 & 0 & 0 & 0 \\ 0 & 1 & 0 & 0 \\ 0 & 0 & 1/d & 0 \end{bmatrix} \begin{bmatrix} X_C \\ Y_C \\ Z_C \\ 1 \end{bmatrix}$$ [Equation 4]

According to Equation 4, when the projection plane is Zc=d, (Xc, Yc, Zc, 1) may be projected as (Xc, Yc, Zc/d) =(D*xC/Zc, D*yc/Zc, 1).

As described above, the processor 120 may correct the third coordinate information that has been corrected to be rotated, to be projected and acquire the final corrected third coordinate information.

However, in the example described above, projection correction is performed after rotation correction, but rotation correction may be performed after projection correction.

Referring back to FIG. 2, the processor 120 may acquire a transformation matrix, that is, a second H matrix, based on the finally corrected third coordinate information and vertex coordinates of the test image. Here, the final corrected third coordinate information and the vertex coordinates of the test image may be normal coordinate system coordinates (or pixel coordinate system coordinates), respectively. For example, if the finally corrected third coordinate information, that is, the four vertex coordinates are d1, d2, and d3, d4, and four vertex coordinates of the actual projection point of the test image are e1, e2, e3, and e4, a second pair of H A matrix may be acquired based on (d1, e1), (d2, e2), and (d3, e4). For example, if it is an FHD resolution projector, e1, e2, e3, and e4 may be (0,0), (1920,0), (0,1080), and (1920, 1080).

The processor 120 may also identify a rectangular area of a maximum size corresponding to an aspect ratio of an input image within the identified area based on the corrected third coordinate information, and acquire fifth information corresponding to the identified rectangular area. For example, the fifth information may include coordinate information of each vertex of the identified rectangular area, and will be named as fifth coordinate information below for convenience of description.

In this case, the processor 120 may expand a rectangle to the same size vertically and horizontally from a center point where vertices of the first area acquired based on the corrected third coordinate information are diagonally connected, and identify whether the vertices of the rectangle meet edges of the first area. In addition, the processor 120 may expand small side of the rectangle in a predetermined pixel unit and a large side of the rectangle to correspond to an aspect ratio when the vertex of the expanded rectangle and the edge of the first area meet. The processor 120 may identify a rectangular area of maximum size at a location where a vertex corresponding to a diagonal of the expanded rectangle meets the edge of the first area.

Figure 9:
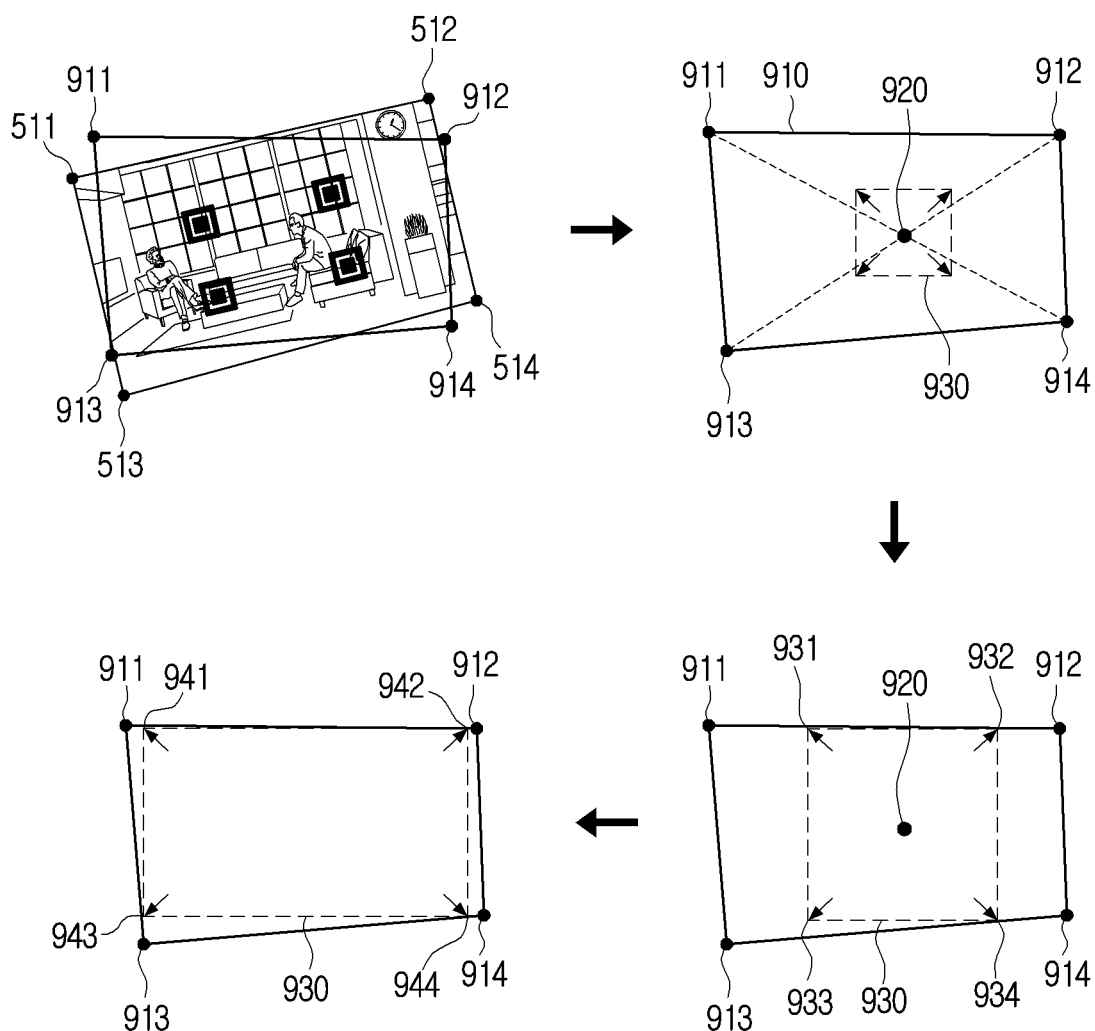
FIG. 9 is a diagram illustrating an example method for identifying a rectangular area of maximum size according to various embodiments.

FIG. 9 is a diagram illustrating an example method for identifying a rectangular area of maximum size according to various embodiments.

As illustrated in FIG. 9, when the corrected third coordinate information d1, d2, d3, and d4, that is, vertices 911, 912, 913, and 914 are acquired, a rectangle may be expanded with a center point 920 diagonally meeting each vertex as a starting point.

According to an embodiment, the rectangle is expanded to the same size from the starting point 920 up, down, left and right, and identify whether there is a portion beyond a projector projection plane 910. When there is no portion beyond the projection plane 910, it may be expanded by a predetermined ratio of a screen (e.g., 5%) and identifies whether the vertices of the expanded rectangle meet edge of the projector projection plane.

When any one 932 of the edges of the projection plane 910 and vertices 931, 932, 933, 934 of the rectangle 930 meets, the small side of the rectangle 930 may expand the rectangle in a predetermined pixel unit (e.g., 1 px), and the large side of the rectangle 930 may expand the rectangle according to a ratio. For example, if one point of the projection plane 910 meets in upper left, upper right, lower left, and lower right edges of the rectangle 930, identify whether the vertex and the projection plane 910 edge meet by moving 1 px to an opposite edge, and identify whether there is a point of contact by expanding the size by 1 px. If vertices not diagonal meet in the upper left, upper right, lower left, and lower right edges of the extended rectangle 930, identify a meeting point by moving 1 px transversely in the opposite direction vertically and horizontally, and identify whether there is a meeting point by expanding the size by 1 px.

When vertices 942 and 943 existing on the diagonal of the expanded rectangle 930 meet a boundary line of the projection plane 910, the expansion may end and coordinates g1, g2, g3, and g4 of the final vertices 941, 942, 943, and 944 may be acquired. In addition, the process may be terminated when a rectangular size moves back to the point where the rectangular size moved in the same situation in order to prevent and/or reduce a location of the rectangle from moving indefinitely.

Referring back to FIG. 2, the processor 120 may perform keystone correction by applying an inverse matrix of the second H matrix to the acquired fifth coordinate information. For example, if the coordinate information of the vertex corresponding to the largest square is g1, g2, g3, and g4, the inverse matrix of the second H matrix may be applied to acquire the coordinates of the projection area to be projected in the electronic apparatus 100. In other words, when the electronic apparatus 100 projects an image based on the coordinates, the user may view the rectangular area of maximum size.

However, in the example described above, it is described as correcting the vertex coordinates of the projected image based on the posture information of the camera, but it may also be possible to correct marker coordinates based on the posture information of the camera. In this case, after correcting the marker coordinates, the vertex coordinates of the projected image may be acquired based on the corrected marker coordinates. In other words, when the marker coordinates are corrected based on the posture information of the camera, it may not be necessary to correct the vertex coordinates based on the camera's posture information.

Figure 10:
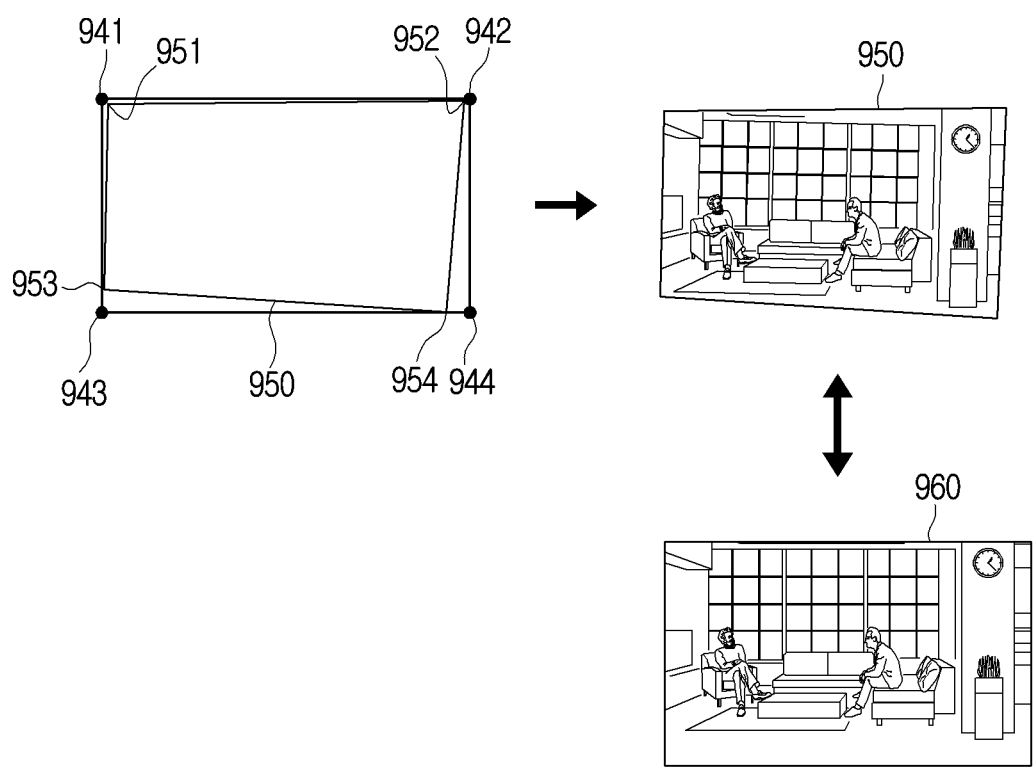
FIG. 10 is a diagram illustrating an example projection image according to a keystone correction according to various embodiments.

FIG. 10 is a diagram illustrating an example projection image according to a keystone correction according to various embodiments.

In FIG. 10, vertices 941, 942, 943, and 944 correspond to fifth coordinate information, and an area identified by the vertices may refer, for example, to a rectangular area of maximum size acquired in FIG. 9. In this case, the processor 120 may apply the inverse matrix of the second H matrix to the fifth coordinate information and determine coordinates of an image to be projected. In other words, the processor 120 may determine an inverse matrix of the second H matrix at the coordinates of the vertices 941, 942, 943, and 944, and determine 951, 952, 953, and 954, which are the vertex coordinates of the keystone-corrected image. In this case, the distorted image 950 is projected since the processor 120 projects the image based on the vertices 951, 952, 953, and 954, but the user can view the rectangular image 960.

Figure 11:
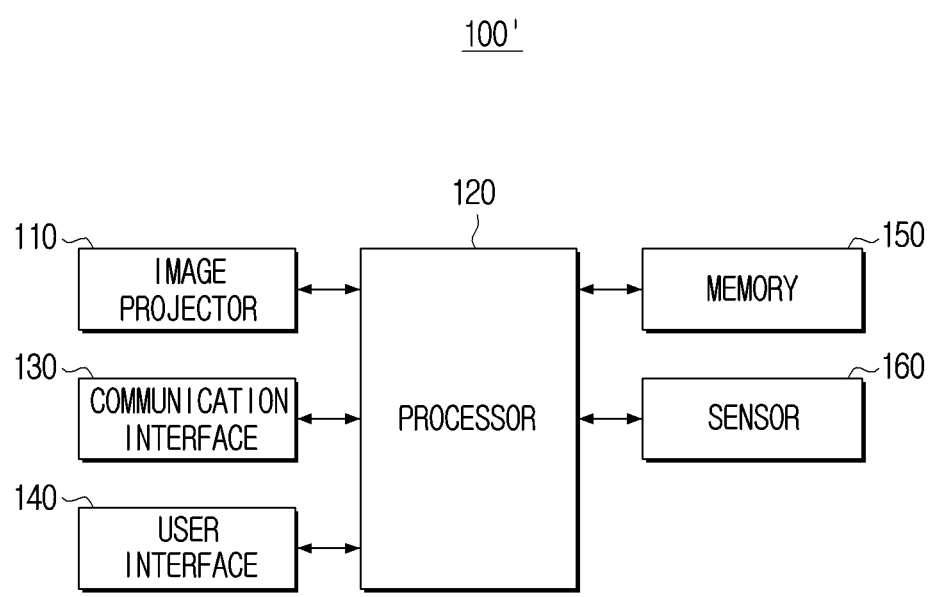
FIG. 11 is a block diagram illustrating an example configuration of an electronic apparatus according to various embodiments.

FIG. 11 is a block diagram illustrating an example configuration of an electronic apparatus according to various embodiments.

According to FIG. 11, an electronic apparatus 100' includes an image projector 110, a processor (e.g., including processing circuitry) 120, a communication interface (e.g., including communication circuitry) 130, a user interface 140, a memory 150, and a sensor 160.

The image projector 110 may enlarge or reduce an image according to a distance (projection distance) from a projection plane. In other words, a zoom function may be performed according to the distance from the projection plane. In this case, the zoom function may include a hardware method for adjusting a size of a screen by moving a lens, and a software method for adjusting the size of the screen by cropping the image. If the zoom function is performed, an adjustment of a focus of the image is necessary. For example, a method of adjusting the focus may include a manual focus method, a motorized method, or the like.

In addition, the image projector 110 may provide a zoom/keystone/focus function by automatically analyzing surrounding environment and projection environment without user input. For example, a projector 110 may automatically provide a zoom/keystone/focus function based on the distance between the electronic apparatus 100 sensed through a sensor (depth camera, distance sensor, infrared sensor, illuminance sensor, etc.) and the projection plane, information on a space in which the electronic apparatus 100 is currently located, information on an ambient light amount, or the like.

The at least one communication interface 130 (hereinafter, referred to as a communication interface) may be implemented as various interfaces according to an implementation example of the electronic apparatus 100'. For example, the communication interface 110 may include various communication circuitry and communicate with an external device (e.g., user terminal 200), an external storage medium (e.g., USB memory), an external server (e.g., web hard drive) through a communication method such as an AP-based Wi-Fi (Wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like.

The user interface 140 may, for example, and without limitation, be implemented as a button, a touch pad, a mouse, a keyboard, or the like, or may be implemented as a touch screen, a remote control transceiver capable of performing the above-described display function and manipulation input function. The remote control transceiver may receive a remote control signal from an external remote control device through at least one communication method among infrared communication, Bluetooth communication, or Wi-Fi communication, or transmit the remote control signal.

The memory 150 may store data required for various embodiments of the disclosure. The memory 150 may be implemented in the form of a memory embedded in the electronic apparatus 100' or may be implemented in the form of a memory detachable to the electronic apparatus 100' depending on a purpose of data storage. For example, data for driving the electronic apparatus 100' may be stored in a memory embedded in the electronic apparatus 100', and data for an extended function of the electronic apparatus 100' may be stored in a memory detachable from the electronic apparatus 100'. Meanwhile, the memory embedded in the electronic apparatus 100' may be implemented as at least one of a volatile memory (e.g., dynamic RAM (DRAM), static RAM (SRAM), or synchronous dynamic RAM (SDRAM)), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). Also, the memory detachable from the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the USB port (e.g., USB memory), or the like.

The sensor 160 may include various types of sensors such as, for example, and without limitation, acceleration sensors, distance sensors, or the like.

According to an example, of the electronic apparatus 100', a speaker, a tuner, and a demodulation unit may additionally be included. The tuner (not shown) can receive an RF broadcast signal by tuning a channel selected by a user or all pre-stored channels among radio frequency (RF) broadcast signals received through an antenna. The demodulation unit (not shown) may receive and demodulate a digital IF signal DIF transformed in the tuner, and perform channel decoding or the like. According to an embodiment, an input image received through the tuner may be processed through the demodulation unit (not shown) and provided to the processor 120 for tone mapping processing according to an embodiment of the disclosure.

Figure 12:
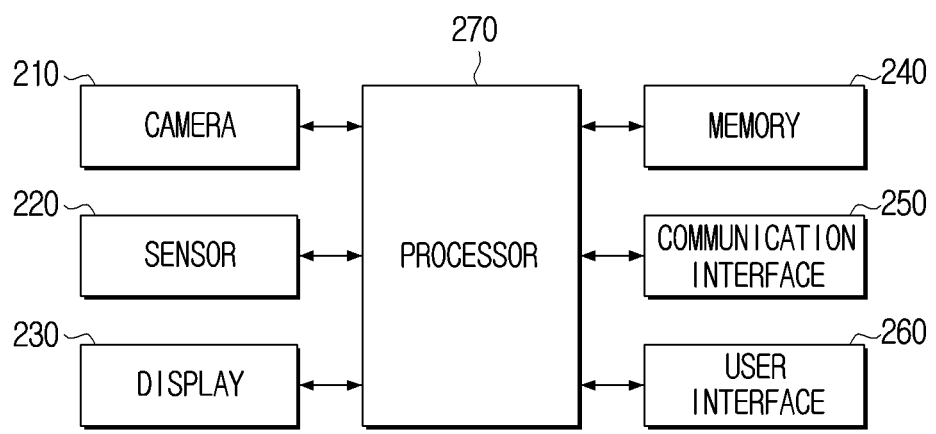
FIG. 12 is a block diagram illustrating an example configuration of a user terminal according to various embodiments.

FIG. 12 is a block diagram illustrating an example configuration of a user terminal according to various embodiments.

According to FIG. 12, the user terminal 200 may include a camera 210, a sensor 220, a display 230, a memory 240, a communication interface (e.g., including communication circuitry 250, a user interface 260 and a processor (e.g., including processing circuitry) 270.

The camera 210 may be turned on according to a predetermined event and perform photographing. The camera 210 may transform the photographed image into an electrical signal and generate image data based on the transformed signal. For example, a subject may be transformed into an electrical image signal through, for example, and without limitation, a coupled charge device (CCD), and the transformed image signal may be amplified and transformed into a digital signal and may be signal processed.

According to an embodiment, the camera 210 may acquire a photographed image by photographing a projection plane on which the image is projected.

The sensor 220 may include at least one acceleration sensor (or gravity sensor). For example, the acceleration sensor may be a three-axis acceleration sensor. The three-axis acceleration sensor measures a gravitational acceleration for each axis and provides a raw data to the processor 270.

In addition, according to an embodiment, the sensor 220 may further include at least one of a distance sensor, a geomagnetic sensor, or a gyro sensor. The distance sensor is an element for sensing a distance from a projection plane. The distance sensor may be implemented in various types such as ultrasonic sensors, infrared sensors, LIDAR sensors, radar sensors, photodiode sensors, or the like. The geomagnetic sensor or gyro sensor may be used to acquire yaw information.

The display 230 may be implemented as a display including a self-luminous element or a display including a non-light-emitting device and a backlight. For example, the display 230 may be implemented in various types of displays such as, for example, and without limitation, liquid crystal display (LCD), organic light emitting diodes (OLED) displays, light emitting diodes (LED), micro LED, Mini LED, plasma display panel (PDP), quantum dot (QD) displays, quantum dot light-emitting diodes (QLEDs), or the like. In the display 110, a driving circuit, a backlight unit, or the like, which may be implemented in the form of an a-si TFT, a low temperature poly silicon (LTPS) TFT, an organic TFT (OTFT), or the like may also be included. Meanwhile, the display 230 may be implemented as a touch screen combined with a touch sensor, a flexible display, a rollable display, a three-dimensional (3D) display, a display in which a plurality of display modules are physically connected, or the like. In addition, the display 230 is equipped with a touch screen and may be implemented to execute a program using a finger or a pen (e.g., a stylus pen).

Other implementations of the memory 240, the communication interface 250, and the user interface 260 are similar to the communication interface 130, the user interface 140, and the memory 150, and thus a detailed description thereof may not be repeated.

According to an embodiment, the processor 270 may include various processing circuitry and acquire second coordinate information indicating a location of each of the plurality of markers in a photographed image when an image of photographing a projection plane is acquired through the camera 210, and may transmit the acquired second coordinate information to the electronic apparatus 100.

According to an embodiment, the processor 270 may control the communication interface 250 to transmit the photographed image to the electronic apparatus 100 without analyzing the photographed image. In this case, the electronic apparatus 100 may acquire second coordinate information indicating the location of each of the plurality of markers in the photographed image.

However, according to an embodiment, the processor 270 may perform some of the aforementioned various processes performed in the electronic apparatus 100 and transmit the result to the electronic apparatus 100.

FIG. 13 is a flowchart illustrating an example method of controlling an electronic apparatus according to an embodiment.

According to a control method described in the flowchart shown in FIG. 13, a test image including a plurality of markers is projected onto a projection plane (S1310).

First information indicating a location of each of the plurality of markers in a test image and second information indicating the location of a plurality of markers in an image in which a projection plane is photographed by an external device may be identified (S1320).

Third information indicating a vertex location of the test image in the photographed image based on the first information and the second information may be acquired (S1330).

The third information may be corrected based on posture information of an external device, and keystone correction may be performed based on the corrected third information (S1340).

Further, in operation S1340, the third information may be corrected to be rotated based on the posture information of the external device, and the third information that has been corrected to be rotated may be corrected to be projected, and the corrected third information may be acquired.

The posture information of the external device may include at least one of roll information, pitch information, or yaw information, and the roll information and pitch information may be acquired through an acceleration sensor provided in the external device, and the yaw information may be acquired based on an angle of view information of a camera used for photographing the projection plane in the external device.

In operation S1340, if it is identified that the projection plane is identified as a predetermined area based on posture information of the external device, at least one of roll information, pitch information, and yaw information may be acquired by changing a reference value of a gravity direction among output values of the acceleration sensor, and the third coordinate information may be corrected based on the acquired information.

In this case, each of the plurality of markers may be in a form of a pattern including a black area and a white area with a predetermined ratio in each of a plurality of directions.

In addition, each of the plurality of markers may be located in an inner area by a predetermined ratio relative to the four vertices of the test image. In this case, in operation S1330, fourth information indicating the vertex location of the test image may be acquired based on the first information and the predetermined ratio, and third information may be acquired from the photographed image based on the fourth information and the first transformation matrix. In this case, a first transform matrix may be acquired based on a mapping relationship between the first information and the second information.

In addition, in operation S1340, a second transformation matrix may be acquired based on the corrected third information and the vertex coordinate information of the test image, and a maximum size of a rectangular area corresponding to an aspect ratio of an input image in the area identified based on the corrected third information may be identified, and keystone correction may be performed.

In operation S1340, keystone correction may be performed by acquiring fifth information corresponding to the identified rectangular area and applying an inverse matrix of the second transformation matrix to the acquired fifth information.

Operation S1340 may include expanding the rectangle at a center point diagonally meeting a vertex of a first area acquired based on the corrected third information, and identify whether a vertex of the expanded rectangle meets an edge of the first area, based on a vertex of the rectangle meeting the edge of the first area, expanding the small side of the rectangle in a predetermined pixel unit, and expand a large side of the rectangle to correspond to the aspect ratio, and identifying the rectangular area having the maximum size at a location where the vertex corresponding to a diagonal of the rectangle meets the edge of the first area.

Operation S1320 may include receiving second information indicating the location of each of the plurality of markers from the external device, or acquiring second information indicating the location of each of the plurality of markers based on the photographed image received from the external device.

The plurality of markers may be located in a plurality of different areas in the test image for distortion correction of the projection plane, and may be of different shapes to identify locations corresponding to each of the plurality of markers.

According to the various embodiments described above, when keystone correction is performed based on an image photographed by an external device, accurate keystone correction may be performed by reflecting the posture information of the external device. Accordingly, user convenience may be improved.

The methods according to the above-described example embodiments may be realized as software or applications that may be installed in the existing electronic apparatus. The methods according to various embodiments of the disclosure may be performed using a deep learning-based artificial neural network (or deep artificial neural network), that is a learning network model.

Further, the methods according to the above-described example embodiments may be realized by upgrading the software or hardware of the existing electronic apparatus.

In addition, various example embodiments as described above may be performed through an embedded server provided in the electronic apparatus or a server outside the electronic apparatus.

The various example embodiments described above may be implemented as an S/W program including an instruction stored on machine-readable (e.g., computer-readable) storage media. The machine is an apparatus which is capable of calling a stored instruction from the storage medium and operating according to the called instruction, and may include an electronic apparatus according to the above-described example embodiments. When the instructions are executed by a processor, the processor may directory perform functions corresponding to the instructions using other components or the functions may be performed under a control of the processor. The instructions may include a code made by a compiler or a code executable by an interpreter. The machine-readable storage media may be provided in a form of a non-transitory storage media. Herein, the "non-transitory" storage medium may not include a signal but is tangible, and does not distinguish the case where a data is semi-permanently stored in a storage medium from the case where a data is temporarily stored in a storage medium.

According to an example embodiment, the method according to the various example embodiments described above may be provided as being included in a computer program product. The computer program product may be traded between a seller and a buyer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various example embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
   an image projector;
   memory storing instructions; and
   at least one processor, comprising processing circuitry, wherein the instructions, when executed, configure the at least one processor to perform operations comprising:
      controlling the image projector to project a test image including a plurality of markers onto a projection plane,
      based on first information indicating a location of the plurality of markers in the test image and second information indicating a location of the plurality of markers in a photographed image of the projection plane photographed by an external device, acquiring third information indicating a location of a vertex of the test image in the photographed image,
      performing correction of the third information based on posture information of the external device acquired by a sensor of the external device, and
      performing keystone correction based on the corrected third information.

2. The apparatus of claim 1,
   wherein the instructions, when executed, configure the at least one processor to perform operations comprising:
      performing rotation correction of the third information based on the acquired posture information, and
      based on distance information between the external device and the projection plane, performing projection correction of the rotation corrected third information, to be projected, and acquiring, as the corrected third information, the projection and rotation corrected third information.

3. The apparatus of claim 2,
   wherein the posture information of the external device includes at least one of roll information, pitch information, or yaw information,
   wherein the roll information and the pitch information are obtained through an acceleration sensor of the external device, and
   wherein the yaw information is acquired based on view angle information of a camera of the external device used to photograph the projection plane.

4. The apparatus of claim 3, wherein the instructions, when executed, configure the at least one processor to perform operations comprising:
 based on the projection plane being identified as a specified area based on the acquired posture information, acquiring at least one of the roll information, the pitch information, or the yaw information by changing a reference value of a gravity direction among output values of the acceleration sensor, and
 rotation correct the third information based on the acquired information.

5. The apparatus of claim 1, wherein each of the plurality of markers is in a pattern form including a black area and a white area with a specified ratio in each of a plurality of directions.

6. The apparatus of claim 1,
 wherein each of the plurality of markers is located in an inner area by a specified ratio based on four vertices of the test image,
 wherein the instructions, when executed, configure the at least one processor to perform operations comprising:
  acquiring fourth information indicating a vertex location of the test image based on the first information and the specified ratio, and
  acquiring the third information from the photographed image based on the fourth information and a first transformation matrix,
 wherein the first transformation matrix is acquired based on a mapping relationship between the first information and the second information.

7. The apparatus of claim 1, wherein the instructions, when executed, configure the at least one processor to perform operations comprising:
 acquiring a second transformation matrix based on the corrected third information and vertex coordinate information of the test image, and
 performing keystone correction by identifying a rectangular area having a maximum size corresponding to an aspect ratio of an input image within the identified rectangular area based on the corrected third information.

8. The apparatus of claim 7, wherein the instructions, when executed, configured the at least one processor to perform operations comprising:
 acquiring fifth information corresponding to the identified rectangular area, and
 performing keystone correction by applying an inverse matrix of the second transformation matrix to the acquired fifth information.

9. The apparatus of claim 7, wherein the instructions, when executed, configure the at least one processor to perform operations comprising:
 expanding the rectangular area at a center point diagonally meeting a vertex of a first area acquired based on the corrected third information, and identifying whether a vertex of the expanded rectangular area meets an edge of the first area,
 based on a vertex of the rectangular area meeting the edge of the first area, expanding a small side of the rectangular area in a specified pixel unit, and expanding a large side of the rectangular area to correspond to the aspect ratio, and
 identifying the rectangular area having a maximum size at a location where the vertex corresponding to a diagonal of the rectangular area meets the edge of the first area.

10. The apparatus of claim 1, further comprising:
 a communication interface comprising communication circuitry;
 wherein the instructions, when executed, configure the at least one processor to perform operations comprising:
  receiving the second information indicating the location of the plurality of markers from the external device through the communication interface, and
  acquiring the second information indicating the location of the plurality of markers based on the photographed image received from the external device through the communication interface.

11. The apparatus of claim 1, wherein the plurality of markers is located in a plurality of different areas in the test image, and the plurality of markers have different shapes.

12. A method for controlling an electronic apparatus comprising:
 projecting a test image including a plurality of markers onto a projection plane;
 based on first information indicating a location of the plurality of markers in the test image and second information indicating a location of the plurality of markers in a photographed image of the projection plane photographed by an external device, acquiring third information indicating a location of a vertex of the test image in the photographed image;
 correcting the third information based on posture information of the external device acquired by a sensor of the external device; and
 performing keystone correction based on the corrected third information.

13. The method of claim 12:
 wherein the correcting of the third information includes rotation correcting the third information based on the acquired posture information; and
 based on distance information between the external device and the projection plane, projection correcting the rotation corrected third information, and acquiring, as the corrected third information, the projection and rotation corrected third information.

14. The method of claim 13,
 wherein the posture information of the external device includes at least one of roll information, pitch information, or yaw information,
 wherein the roll information and the pitch information are obtained through an acceleration sensor of the external device, and
 wherein the yaw information is acquired based on view angle information of a camera of the external device used for photographing the projection plane.

15. The method of claim 14, further comprising:
 based on the projection plane being identified as a specified area based on the acquired posture information, acquiring at least one of the roll information, the pitch information, or the yaw information by changing a reference value of a gravity direction among output values of the acceleration sensor, and
 rotation correcting the third information based on the acquired information.

16. The method of claim 12, wherein each of the plurality of markers is in a pattern form including a black area and a white area with a specified ratio in each of a plurality of directions.

17. The method of claim 12,
 wherein each of the plurality of markers is located in an inner area by a specified ratio based on four vertices of the test image, and the method further comprises:
  acquiring fourth information indicating a vertex location of the test image based on the first information and the specified ratio, and
  acquiring the third information from the photographed image based on the fourth information and a first transformation matrix,
wherein the first transformation matrix is acquired based on a mapping relationship between the first information and the second information.

18. The method of claim 12, further comprising:
acquiring a second transformation matrix based on the corrected third information and vertex coordinate information of the test image, and
performing keystone correction by identifying a rectangular area having a maximum size corresponding to an aspect ratio of an input image within the identified rectangular area based on the corrected third information.

19. The method of claim 18, further comprising:
acquiring fifth information corresponding to the identified rectangular area, and
performing keystone correction by applying an inverse matrix of the second transformation matrix to the acquired fifth information.

20. The method of claim 18, further comprising:
expanding the rectangular area at a center point diagonally meeting a vertex of a first area acquired based on the corrected third information, and identifying whether a vertex of the expanded rectangular area meets an edge of the first area,
based on a vertex of the rectangular area meeting the edge of the first area, expanding a small side of the rectangular area in a specified pixel unit, and expanding a large side of the rectangular area to correspond to the aspect ratio, and
identifying the rectangular area having a maximum size at a location where the vertex corresponding to a diagonal of the rectangular area meets the edge of the first area.

* * * * *